United States Patent [19]

Stoeckigt et al.

[11] 4,280,919
[45] Jul. 28, 1981

[54] DETERGENTS AND CLEANSERS CONTAINING OXYALKYLATED ALCOHOLS AS BIODEGRADABLE, LOW-FOAM SURFACTANTS

[75] Inventors: Dieter Stoeckigt; Dieter Kiessling, both of Ludwigshafen; Johannes Perner, Neustadt; Wolfgang Trieselt, Ludwigshafen; Horst Trapp, Plankstadt, all of Fed. Rep. of Germany

[73] Assignee: BASF Aktiengesellschaft, Ludwigshafen, Fed. Rep. of Germany

[21] Appl. No.: 144,948

[22] Filed: Apr. 29, 1980

[30] Foreign Application Priority Data

May 10, 1979 [DE] Fed. Rep. of Germany ....... 2918826

[51] Int. Cl.³ .................. C11D 1/722; C11D 3/075; C11D 3/10; C11D 3/37
[52] U.S. Cl. .................. 252/135; 252/99; 252/174.14; 252/174.21; 252/174.24; 252/174.25; 252/527; 252/DIG. 1; 568/625
[58] Field of Search .................. 568/625; 252/99, 135, 252/174.21, 174.22, DIG. 1, 174.14, 527, 174.24, 174.25

[56] References Cited

U.S. PATENT DOCUMENTS

| | | | |
|---|---|---|---|
| 3,185,562 | 5/1965 | Scoles | 568/625 |
| 3,203,955 | 8/1965 | Jackson | 568/625 |
| 3,340,309 | 9/1967 | Weipert | 568/625 |
| 3,489,690 | 1/1970 | Lachampt | 568/625 |
| 3,504,041 | 3/1970 | Weipert | 568/625 |
| 3,635,827 | 1/1972 | Jakobi | 252/174.21 |
| 3,770,701 | 11/1973 | Cenker | 568/625 |
| 3,931,271 | 1/1976 | Baumann | 568/625 |
| 3,969,134 | 7/1976 | Batka | 134/28 |

FOREIGN PATENT DOCUMENTS 2140010 2/1973 Fed. Rep. of Germany ...... 252/174.21
1097491 1/1968 United Kingdom ................ 252/174.21

OTHER PUBLICATIONS

Schönfeldt, "Grenzflachenaktive Athylene Oxid-Addukte" Wissenshaftliche Verlagsgesellschaft MBH Stuttgart 1976, p. 55.

Primary Examiner—Dennis L. Albrecht
Attorney, Agent, or Firm—Oblon, Fisher, Spivak, McClelland & Maier

[57] ABSTRACT

A detergent and cleanser which contains an oxyalkylated alcohol of the formula

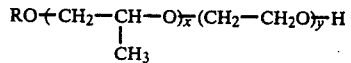

where R is $C_8$–$C_{18}$-alkyl, x is from 2 to 4.5 and y is from 2 to 5, as a low-foam, biodegradable surfactant additive.

5 Claims, No Drawings

DETERGENTS AND CLEANSERS CONTAINING OXYALKYLATED ALCOHOLS AS BIODEGRADABLE, LOW-FOAM SURFACTANTS

The present invention relates to detergents and cleansers which contain particular oxyalkylated alcohols (the degree of oxyalkylation being low), which exhibit low foaming and particularly good biodegradability.

Special detergents, which are used, in particular, for automatic dishwashers, can in general be formulated from inorganic salts, eg. sodium tripolyphosphate, alkaline builders, eg. sodium metasilicate, chlorinated inorganic compounds, eg. chlorinated trisodium phosphate, organic compounds, which may or may not possess a chlorinating action, eg. dichloroisocyanurates, and surfactants, eg. oxyalkylated alcohols or oxyalkylated alkylphenols. In these compositions, the last-mentioned components (the surfactants) in general serve as wetting agents, anti-foam agents and additional cleansing components. Over and above the last-mentioned properties, which such agents must exhibit, the surfactants should also be biodegradable.

In the case of surfactants intended to give useful results specifically in automatic dishwashers, it is necessary that these materials should be of substantially equal efficiency at relatively high and relatively low temperatures, should be very low-foaming and should furthermore wet the dishes to be washed in such a way that while the dishes are cooling the water easily runs off them, so that the dishes dry of their own accord.

Hitherto, it has not proved entirely possible to achieve a very good anti-foam effect with any of the conventional biodegradable surfactants.

Detergents for automatic dishwashers must possess a cleansing power and solubility which are such that no haze or residue is left on the dishes. Finally, very small amounts should suffice to give a very good effect, and should be equally efficient at high and low temperatures.

The surfactant formulations used should have a sufficiently high cloud point (about 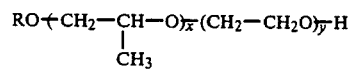) that they are very effective even for hot rinses, but this criterion has hitherto in most cases been met at the expense of the anti-foam properties.

The patent literature discloses a plurality of surfactants, based on ethylene oxide/propylene oxide, for use as detergent and cleanser additives. However, hitherto all these agents, whilst exhibiting one or other of the required properties, have failed to satisfy all the criteria simultaneously.

German Laid-Open Application DOS No. 2,140,010 discloses oxyalkylation products obtained by first oxyethylating and then oxypropylating relatively longchain fatty alcohols. It is true that with these products the above problems can be partially solved, but they are not entirely satisfactory in simultaneously giving low-foam characteristics and biodegradability.

Schönfeldt, "Grenzflächenaktive Äthylenoxid-Addukte", Wiss.Verlagsgesellschaft mbH, Stuttgart, 1976, page 55, discloses the oxypropylation, followed by oxyethylation, of lauryl alcohol and mentions certain properties which allegedly depend on the amount of propylene oxide used to form the adduct. However, this publication does not give precise numerical data.

British Pat. No. 1,097,491 describes monohydric aliphatic alcohols, for example of 8 to 10 carbon atoms, which have been oxyalkylated, in most cases first with from 4 to 12 moles of propylene oxide and then with from 6 to 16 moles of ethylene oxide. These products are intended to be used, for example, in detergents for wool. It is true that these products are biodegradable, but their low-foam characteristics are inadequate.

Finally, German Laid-Open Application DOS No. 1,645,011 discloses oxyalkylated fatty alcohols which, according to a preferred embodiment, are obtained by oxypropylation, followed by oxyalkylation with a mixture of ethylene oxide and propylene oxide. These products are also insufficiently low-foaming.

It is an object of the present invention to provide nonionic substances which 1. exhibit a good cleansing action, especially in dishwashing detergents,
2. have a good final rinsing action,
3. are low-foaming and
4. are highly biodegradable.

We have found that this object is achieved by providing detergents and cleansers which contain, as low-foaming biodegradable surfactant additives, oxyalkylated alcohols of the formula $$RO\text{--}(CH_2\text{--}\underset{\underset{CH_3}{|}}{CH}\text{--}O)_{\overline{x}}(CH_2\text{--}CH_2O)_{\overline{y}}H$$

where R is $C_8$–$C_{18}$-alkyl, x is from 2 to 4.5 and y is from 2 to 5.

The above products are fatty alcohols or fatty alcohol mixtures which have been oxyalkylated first with from 2 to 4.5 moles of 1,2-propylene oxide and then with from 2 to 5 moles of ethylene oxide. Accordingly, they contain at most 9.5 alkylene oxide groups per molecule. The fact that in spite of this low degree of oxyalkylation and in spite of the relatively poor solubility of the products in water, an optimum cleansing and final rinsing effect can be achieved, is surprising since it is considered in the prior art (German Laid-Open Application DOS No. 2,140,010 and British Pat. No. 1,097,491) that substantially more alkylene oxide units per molecule are required to produce these effects.

The good biodegradability was also not foreseeable, since it is generally known that propylene oxide adducts are of relatively poor degradability.

The starting compounds for the preparation of the adducts are aliphatic alcohols of 8 to 18 carbon atoms.

Suitable alcohols are those which have the requisite number of carbon atoms and are branched or, preferably, straight-chain, and saturated. Specific examples are decyl alcohol, undecyl alcohol, lauryl alcohol, tridecyl alcohol, tetradecyl alcohol, pentadecyl alcohol, cetyl alcohol, heptadecyl alcohol, stearyl alcohol, hydrogenated tallow alcohol and mixtures of these. Mixtures of these alcohols obtained industrially from the synthesis of alcohols, for example from aluminum-alkyls by the Ziegler method, may also be used. Examples of such alcohols are the $C_{10}$–$C_{12}$-, $C_{12}$–$C_{14}$-, $C_{14}$–$C_{16}$- and $C_{16}$–$C_{18}$-alkanol cuts. The alcohols or alcohol mixtures prepared by oxosynthesis and which contain the number of carbon atoms required by the above definition, are particularly important.

For industrial purposes, the last-mentioned alcohol mixtures, and especially the $C_9$–$C_{11}$- and $C_{13}$–$C_{15}$-oxo-alcohols, are preferred. However, the products according to the invention can also be prepared with the individual alcohols which have been defined, and the resulting products can be added to the novel agents for the purposes of the invention. However, from an economic point of view it is more advantageous to employ the cheaper mixtures, since this avoids timeconsuming and expensive separation of the individual compounds.

The alcohols or alcohol mixtures are reacted with the specified amounts of propylene oxide, followed by ethylene oxide, in accordance with conventional methods; the methods do not require any specific discussion—for example, reference may be made to the above monograph by Schönfeldt.

A detergent and cleanser formulation in which the adducts to be used according to the invention may be employed contains, as other ingredients, the conventional additives, namely builders, softeners and bleaching agents, and may or may not contain fragrances and clouding agents.

Builders which may be present in the detergent formulations are phosphates—which are still the most commonly used—or phosphate substitutes, such as polyacrylic acid, polymaleic acid, maleic acid/vinyl ether copolymers, nitrilotriacetic acid or inorganic substances, eg. zeolites. The detergents contain from 10 to 50% by weight, based on the total formulation, of builders. They additionally contain fillers, eg. sodium sulfate and sodium carbonate. In general, the detergents contain from about 1 to 10% by weight of the adducts to be employed according to the invention.

In detergents for dishwashing, especially for automatic dishwashing machines, the ratios are different. These products contain up to 99.5% by weight of builders and alkaline compounds, such as sodium carbonate; the amount of the adduct is from 0.5 to 5% by weight.

The formulations, regardless of their type, exhibit extremely low-foaming characteristics and excellent cleansing power if they contain the adducts described; furthermore, in the case of dishwashing detergents, the final rinsing effect is also improved.

The Examples which follow illustrate the invention.

EXAMPLES

The following products were tested in respect of their performance characteristics:

(1) $C_{13}/C_{15}$-oxo-alcohol+4PO+2.26EO (block copolymer)
(2) $C_{13}/C_{15}$-oxo-alcohol+4PO+4EO (block copolymer)
(3) $C_9/C_{11}$-oxo-alcohol+3.9PO+2.1EO (block copolymer)

The following were also tested, for comparative purposes:
(4) Tallow alcohol+4EO+7PO (block copolymer) according to German Laid-Open Application DOS 2,140,010
(5) $C_9/C_{11}$-oxo-alcohol+6EO/7PO (copolymer)
(6) $C_9/C_{11}$-oxo-alcohol+2PO(3EO/2PO) (PO block-+EO/PO copolymer block, according to German Laid-Open Application DOS 1,645,011)
PO=propylene oxide
EO=ethylene oxide The products were tested as follows in an automatic dishwasher:

Several dishwasher detergent formulations were prepared from sodium tripolyphosphate, sodium tetrapolyphosphate, sodium metasilicate and sodium carbonate, with or without potassium dichloroisocyanurate and nonionic condensates.

Conventional products, and the products to be employed according to the invention, were used as the surfactants in these formulations.

The content of nonionic surfactants was 1 percent when testing the cleansing action and 5 percent when testing the foaming characteristics in the presence of protein ("egg test").

The number of revolutions of the rinsing arm in an automatic dishwasher was determined by magnetic induction measurement, using a counter.

Foaming, which occurs especially in the presence of surfactants and proteins, reduces the speed of revolution of the rinsing arm. This reduction provides a measure of the efficiency of a surfactant in a dishwasher.

The test time was 12 minutes, and the number of revolutions per minute was calculated from the total number of revolutions after various intervals of time. The washing cycle started at room temperature and after about 10 minutes the water temperature was 60° C.

Test of cleansing action 20 plates were washed under actual use conditions in 3 passes—the plates being dirtied afresh after each pass—using a dishwasher detergent formulation comprising 45 parts of sodium carbonate, 1.5 parts of potassium dichloroisocyanurate and 1 part of surfactant.

The plates were dirtied by applying a potato flour/water mixture and allowing this to dry in an oven. After each pass, 3 plates were taken out and tested, for increased build-up of a layer of starch, by means of an iodine-based indicator. The 3 plates taken out were replaced by 3 new plates freshly coated with the potato flour/water mixture. Accordingly, the amount of starch present on the plates was the same for each washing cycle. The starch residues remaining on the plates after the 3 passes were assessed. In addition, streaking was tested by adding deep-frozen spinach to the washing liquor.

In every case, an excellent cleansing action was achieved, even in the presence of protein.

Testing the final rinsing effect

The final rinsing liquor consisted, based on weight of liquor, of 20% of a surfactant of the above composition, 10% of Na cumenesulfonate and 6% of a mixture of 30% of succinic acid, 45% of glutaric acid and 25% of adipic acid, the remainder being water.

After one rinse in the dishwasher, the draining, haze, streaking and blotching were assessed visually, and rated on a scale from 1 (very poor) to 5 (very good).

Table 1, which follows, lists the results.

TABLE 1

| Surfactant | Cleansing action Residual starch, % | Final rinsing effect | | | | Cloud point °C. | Foaming test (egg test) rpm |
|---|---|---|---|---|---|---|---|
| | | Draining | Haze | Streaking | Blotching | | |
| 1 | .23 | 3 | 4.5 | 4.5 | 3 | 44 | 118 |
| 2 | 25 | 2 | 3.5 | 4.5 | 2.5 | 48 | 103 |
| 3 | 23 | 3 | 4.5 | 4.5 | 3 | 50 | 110 |
| 4 | 24 | 2.5 | 3 | 4 | 2.5 | 31 | 116 |
| 5 | 33 | 2.5 | 3 | 4.5 | 2.5 | 69 | 82 |
| 6 | 30 | 2.5 | 3 | 4.5 | 2.5 | 66 | 88 |

The results show that the surfactants to be used according to the invention have a cleansing action which is at least equivalent to that of the prior art products (Examples 4 to 6) and is in fact superior in the case of Examples 5 and 6. The same is true of the final rinsing effect. The low-foam characteristics are substantially better than those of products 5 and 6.

Product 4, which has comparably good low-foam properties, suffers from a substantially lower cloud point, which entails other disadvantages—the final rinse in this case results in substantially more haze and streaking.

What is undoubtedly surprising is the excellent low level of foam in spite of the high cloud points, compared to products 5 and 6 which have similar cloud points but give an absolutely unsatisfactory level of foaming.

Test of biodegradability

The test is carried out in accordance with the OECD confirmatory test described in "OECD Technical Report of 11th June, 1976, on Determination of the Biodegradability of Nonionic Surface Active Agents", incorporated into the German "Verordnung über die Abbaubarkeit von anionischen und nichtionischen grenzflächenaktiven Stoffen in Waschund Reinigungsmitteln", published in the Bundesgesetzblatt 1977, part I, pages 244 et seq., on 30.1.1977.

According to this, only surfactants which are biodegradable to the extent of at least 80% by weight are permitted in the Federal Republic of Germany.

The results are shown in Table 2 below:

TABLE 2

| Substance tested | Biodegradability in % by weight |
| --- | --- |
| Isodecanol + 2 PO + 4.5 EO | 85 |
| Isodecanol + 2.3 PO + 10 EO | 75 (comparison) |
| Ziegler $C_{10}/C_{12}$-oxo-alcohol | |
| + 2 PO + 4 EO | 82 |
| + 4 PO + 8 EO | 75 (comparison) |
| $C_{13}/C_{13}$-oxo-alcohol + 4 PO + 2 EO | 94 |

TABLE 2-continued

| Substance tested | Biodegradability in % by weight |
| --- | --- |
| $C_{13}/C_{13}$-oxo-alcohol + 4 PO + 4 EO | 87 |
| $C_{13}/C_{13}$-oxo-alcohol + 4.5 PO + 5.5 EO | 78 (comparison) |
| $C_{13}/C_{13}$-oxo-alcohol + 7 PO + 7 EO | 60 (comparison) |
| $C_9/C_{11}$-oxo-alcohol + 4 PO + 2 EO | 88 |
| $C_9/C_{11}$-oxo-alcohol + 4 PO + 4 EO | 91 |
| $C_9/C_{11}$-oxo-alcohol + 7 PO + 4 EO | 71 (comparison) |
| Isononanol + 2.5 PO + 8.5 EO | 65 (comparison) |

The values show that even if the EO and PO content as defined according to the present invention is only slightly exceeded, the biodegradability falls below the legally permitted limit.

We claim:

1. A dishwashing detergent composition which comprises:
   10–99.5% by weight based on the total formulation, of builders selected from the group consisting of phosphates, polyacrylic acid, polymaleic acid, maleic acid/vinyl ether copolymers, nitrilotriacetic acid and zeolites, and
   0.5–10% by weight of an alkoxylated alcohol of the formula:

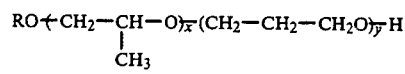

wherein R is $C_8$–$C_{18}$-alkyl, x is from 2 to 4.5, and y is from 2 to 5.

2. A detergent as claimed in claim 1, in which R in the formula given in claim 1 is saturated straight chain $C_8$–$C_{18}$ alkyl.

3. A detergent and cleanser as claimed in claim 1, in which R in the formula given in claim 1 is $C_9/C_{11}$-alkyl or $C_{13}/C_{15}$-alkyl.

4. The detergent composition of claim 1, wherein said detergent also contains sodium carbonate.

5. The detergent of claim 1, wherein said detergent contains 0.5–5% by weight of said alkoxylated alcohol.